United States Patent Office 3,850,877
Patented Nov. 26, 1974

3,850,877
PIPERIDINE STABILIZERS FOR POLYMERS
Barry Cook, Manchester, England, assignor to
Ciba-Geigy Corporation
No Drawing. Filed July 17, 1973, Ser. No. 380,042
Claims priority, application Great Britain, July 28, 1972,
35,489/72
Int. Cl. C08f 45/60; C08g 51/60
U.S. Cl. 260—45.8 N                          13 Claims

ABSTRACT OF THE DISCLOSURE

Disclosed are stabilised compositions comprising an organic material, especially polyolefines, and a minor proportion of a piperidine derivative, in particular esters and amides of substituted (piperidinyl-4) acetic acid. The new compositions possess good light stability.

In British Patent Specification No. 1,214,426 there is described the compound having the formula:

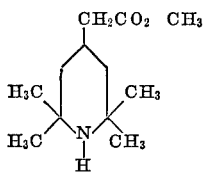

The compound is disclosed as starting material for the production of 2,2,6,6-tetramethyl quinuclidine which is said to be pharmacologically active.

A Russian publication Khim. Pharm. ZH, 1970, 4, (10), pages 16 to 21 describes compounds having the formula:

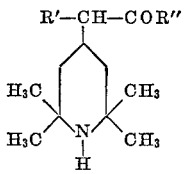

wherein (a) R′ is $CH_3$ and R″ is $OCH_3$ (b) R′ is $C_2H_5$ and R″ is $OCH_3$ or (c) R′ is $C_2H_5$, $R_{22}$ is $NH_2$ and (d) is hydrogen and R″ is

Again the only utility for these compounds which is suggested in this paper is their use as intermediates for pharmacologically active quinuolidines.

We have now found that these known compounds and certain novel compounds related to those described above have utility in a totally different field viz. in the stabilisation of polymeric material against the effects of exposure to light.

Accordingly, the present invention provides a composition comprising an organic material and a minor proportion of a compound of the formula I

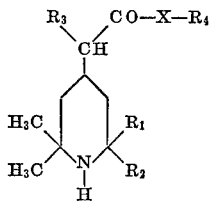

wherein $R_1$ and $R_2$ are the same or different and each is a straight or branched alkyl residue having from 1 to 12 carbon atoms, or $R_1$ and $R_2$ together with the carbon atom to which they are attached form a cycloalkyl residue having from 5 to 12 carbon atoms; $R_3$ is hydrogen, a straight or branched alkyl residue having from 1 to 4 carbon atoms, an aralkyl residue having from 7 to 9 carbon atoms or a cycloalkyl residue having 5 or 6 carbon atoms; $R_4$ is hydrogen, a hydrocarbyl residue having from 1 to 20 carbon atoms, either unsubstituted or substituted by halogen, or interrupted by one or more oxygen or sulphur atoms, or $R_4$ has the structure:

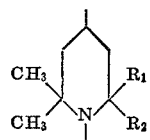

wherein Y is hydrogen or a straight- or branched-alkyl residue having from 1 to 12 carbon atoms, an alkenyl residue having from 3 to 12 carbon atoms, or an aralkyl residue having from 7 to 12 carbon atoms; $R_1$ and $R_2$ have their previous significance or $R_4$ and $R_5$, together with the nitrogen atom to which they are bound form a heterocyclic residue having from 4 to 10 carbon atoms; X is —O—, —S—, or >$NR_5$, wherein $R_5$ has the same significance as $R_3$ as well as the salts of the compounds of Formula I.

$R_4$ can be for instance, hydrogen, a monovalent, straight- or branched-alkyl or alkenyl residue having from 1 to 20 carbon atoms, a cycloalkyl residue having from 5 to 10 carbon atoms, an aralkyl residue having from 7 to 12 carbon atoms, an aryl residue having from 6 to 15 carbon atoms, or $R_4$ and $R_5$ together with the nitrogen atom to which they are bound can form a heterocyclic residue having from 4 to 10 carbon atoms and optionally having one other heteroatom.

When $R_4$ is an aliphatic, alicyclic, aryl or aralkyl residue, then each of these residues may be unsubstituted or substituted by halogen or interrupted by one or more oxygen or sulphur atoms.

Examples of Y, in the structure of formula IA, are hydrogen, methyl, ethyl, n-propyl, isopropyl, n-butyl, sec-butyl, n-hexyl, n-octyl, n-dodecyl, allyl, α-methallyl, 10-undecenyl, benzyl, α-methylbenzyl, p-methylbenzyl, α,p-dimethylbenzyl and α-naphthylmethyl residues.

Particularly preferred hydrocarbyl substituents Y are straight- or branched alkyl groups having from 1 to 4 carbon atoms and the most preferred substituents are hydrogen and methyl.

Examples of the groups $R_1$ and $R_2$ are methyl, ethyl, n-propyl, isopropyl, n-butyl, sec-butyl, n-hexyl, n-dodecyl, or together with the carbon to which they are bound $R_1$ and $R_2$ can form a group such as:

Particularly preferred substituents $R_1$ and $R_2$ are straight or branched alkyl groups having 1 to 4 carbon atoms and most preferably each of $R_1$ and $R_2$ is methyl.

Examples of the groups $R_3$ and $R_5$ are hydrogen, methyl ethyl, n-propyl, isopropyl, n-butyl, sec-butyl, benzyl, α-methylbenzyl, α,p-dimethylbenzyl, cyclohexyl, cyclopentyl.

Preferred substituents $R_3$ and $R_5$ are hydrogen or alkyl having 1 to 4 carbon atoms and most preferably each of $R_3$ and $R_5$ is hydrogen.

Examples of the group $R_4$ apart from hydrogen are methyl, ethyl, n-propyl, isopropyl, n-butyl, sec-butyl, t-butyl, n-pentyl, neopentyl, 2-ethylpropyl, 2-methylbutyl, n-hexyl, n-octyl, t-octyl, n-dodecyl, n-octadecyl, eicosyl, 2-methoxyethyl, 3-chloropropyl, 2-methylthioethyl, allyl, α-methallyl, dec-9-enyl, heptadec-8-enyl, crotyl, cinnamyl, propargyl, 2,4-hexadienyl, benzyl, α-methylbenzyl, a,p-dimethylbenzyl, diphenylmethyl, 2-chlorobenzyl, cyclopentyl, cyclohexyl, cyclooctyl, 4-methylcyclohexyl, cyclododecyl, 4-chlorocyclohexyl, 9-fluorenyl, adamantyl, phenyl, 4-methylphenyl, 4-t-octylphenyl, 2-chlorophenyl, 4-methoxyphenyl, α-naphthyl, 4-biphenyl, 2-fluorenyl residues or the group:

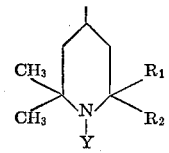

wherein $R_1$, $R_2$ and Y have their previous significance.

Examples of structures where $R_4$ and $R_5$ form a ring system, together with the nitrogen to which they are bound are 1-pyrrolidinyl, 1-piperidinyl and 1-morpholinyl.

Examples of salts of the compounds of formula I according to the invention include salts of an inorganic acid, such as phosphates, carbonates, sulphates, chlorides and the like, as well as organic acid salts such as acetates, stearates, maleates, citrates, tartrates, oxalates, benzoates and substituted carbamic acids.

Examples of the esters and amides of formula I envisaged are given in the following list:

Ethyl(2,2,6,6-tetramethylpiperidinyl-4)acetate
2'-Methoxyethyl(2,2,6,6-tetramethylpiperidinyl-4)acetate
2'-Methylthioethyl(2,2,6,6-tetramethylpiperidinyl-4)acetate
n-Butyl(2,2,6,6,-tetramethylpiperidinyl-4)acetate
n-Octyl(,2,2,6,6-tetramethylpiperidinyl-4)acetate
n-Octyl(2,2,6,6-tetramethylpiperidinyl-4)acetate
n-Octadecyl(2,2,6,6-tetramethylpiperidinyl-4)acetate
Cyclohexyl(2,2,6,6-tetramethylpiperidinyl-4)acetate
1'-Adamantyl(2,2,6,6-tetramethylpiperidinyl-4)acetate
4'-Chlorocyclohexyl(2,2,6,6-tetramethylpiperidinyl-4) acetate
Benzyl(2,2,6,6-tetramethylpiperidinyl-4)acetate
4'-Methoxybenzyl(2,2,6,6-tetramethylpiperidinyl-4) acetate
Phenyl(2,2,6,6-tetramethylpiperidinyl-4)acetate
2'-Chlorophenyl(2,2,6,6-tetramethylpiperidinyl-4)acetate
(2',2',6',6'-Tetramethylpiperidinyl-4')-(2,2,6,6-tetramethylpiperidinyl-4)acetate
Allyl(2,2,6,6-tetramethylpiperidinyl-4)acetate
Oleyl(2,2,6,6-tetramethylpiperidinyl-4)acetate
Crotyl(2,2,6,6-tetramethylpiperidinyl-4)acetate
Cinnamyl(2,2,6,6-tetramethylpiperidinyl-4)acetate
α-(n-Butyl)ethyl(2,2,6,6-tetramethylpiperidinyl-4)acetate
α-(n-Octyl)butyl(2,2,6,6-tetramethylpiperidinyl-4)acetate
N-n-Hexyl(2,2,6,6-tetramethylpiperidinyl-4)acetamide
N-n-Dodecyl(2,2,6,6,-tetramethylpiperidinyl-4) acetamide
N-n-Octadecyl(2,2,6,6-tetramethylpiperidinyl-4) acetamide
N,N-Di-(n-butyl) (2,2,6,6-tetramethylpiperidinyl-4) acetamide
N-Benzyl(2,2,6,6-tetramethylpiperidinyl-4)acetamide
N-Cyclohexyl(2,2,6,6-tetramethylpiperidinyl-4) acetamide
N-Phenyl(2,2,6,6-tetramethylpiperidinyl-4)acetamide
N-(4'-Chlorophenyl) (2,,26,6-tetramethylpiperidinyl-4) acetamide
N-Allyl(2,2,6,6-tetramethylpiperidinyl-4)acetamide
(2,2,6,6-Tetramethylpiperidinyl-4)acetamide
α-(n-Butyl)ethyl(2,2,6,6-tetramethylpiperidinyl-4) acetate
α-(n-Butyl)-N-hexyl(2,2,6,6-tetramethylpiperidinyl-4) acetamide
α-(2'-Butyl)-N-hexyl(2,2,6,6-tetramethylpiperidinyl-4) acetamide
Butyl(2,2-dimethyl-6,6-dipropylpiperidinyl-4)acetate n-Octadecyl(2,2,6-trimethyl-6-butylpiperidinyl-4)acetate
Ethyl(2,2,6,6-tetramethylpiperidinyl-4)thioacetate
n-Octyl(2,2,6,6-tetramethylpiperidinyl-4)thioacetate
n-Octadecyl(2,2,6,6-tetramethylpiperidinyl-4)thioacetate
Cyclohexyl(2,2,6,6-tetramethylpiperidinyl-4)thioacetate
Phenyl(2,2,6,6-tetramethylpiperidinyl-4)thioacetate
Benzyl(2,2,6,6-tetramethylpiperidinyl-4)thioacetate
n-Octyl(2,2-diisopropyl-6,6-dimethylpiperidinyl-4)acetate
Ethyl(1-aza-2,2-dimethylspiro[5,5'-]undecyl-4)acetate
(2,2,6,6-Tetramethylpiperidinyl-4)acetic acid hydrochloride Compounds of formula I may be prepared by reacting a compound having the formula:

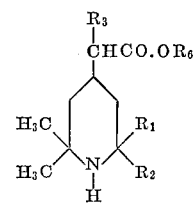

wherein $R_1$, $R_2$ and $R_3$ have their previous significance and $R_6$ is hydrogen or an alkyl group having from 1 to 4 carbon atoms, with a compound having the formula:

$$R_4XH \qquad III$$

wherein $R_4$ and X have their previous significance.

The reaction may be conveniently effected with or without the use of a catalyst and a solvent. If a catalyst is used however, it may be a lithium amide, an alkali metal alkoxide, p-toluene sulphonic acid, calcium hydroxide, tetra-butyl titanate or di-butyl tin oxide. If a solvent is used, the solvent is one which is inert to the reactants and the reaction product. Suitable solvents include benzene, toluene, cyclohexane and dioxan.

The reaction is preferably carried out at an elevated temperature, for instance at a temperature within the range of from 100° to 200° C. Advantageously, the alcohol $R_6OH$, which is produced during the reaction, is allowed to distil out of the reactor as it is formed.

If desired, the crude reaction product may be purified, for instance by solvent extraction and by subsequent recrystallisation from a suitable solvent, or by re-distillation if the product is a liquid.

The starting-material of formula II may be produced for example by hydrogenation of a compound having the formula:

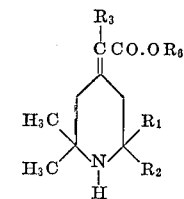

wherein $R_1$, $R_2$, $R_3$ and $R_6$ have their previous significance.

In a second process, a compound of formula I is produced by hydrogenating a compound having the formula:

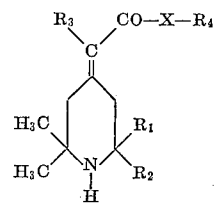

wherein $R_1$, $R_2$, $R_3$, $R_4$, X have their previous significance.

The hydrogenation of IV and V may be conveniently effected using molecular hydrogen or using chemical means such as lithium aluminium hydride. If molecular hydrogen is used, the hydrogenation may be conducted in known manner using a hydrogenation catalyst such as palladium, platinum, rhodium or nickel, preferably supported on a carrier such as silica, calcium carbonate or carbon. Advantageously the reaction is conducted at elevated temperature and pressure.

In a third, less preferred manner, a compound of formula I is produced by reacting a compound having the formula:

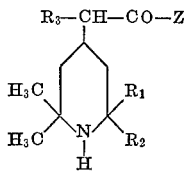

wherein $R_1$, $R_2$, and $R_3$ have their previous significance and Z is halogen, with a compound having the formula III as hereinbefore defined.

The reaction is conveniently effected in a solvent inert to the reactants and the reaction products. Suitable solvents include benzene, toluene, cyclohexane and dioxan. Advantageously the reaction is effected at an elevated temperature, preferably at the reflux temperature of the reaction mixture.

Salts of the compounds of formula I may be prepared by the reaction of the free base with an organic or inorganic acid in a soluble solvent e.g., benzene, ether, cyclohexane.

Those compositions are preferred which contain a compound of formula I wherein the substituent $R_4$ has at least 5 carbon atoms for reason of superior compatibility and/or lower volatility.

Compounds of formula I have been found to impart to polyolefines a high degree of stability towards deterioration normally induced by the effects of ultra-violet radiation or exposure to heat. Moreover, this improved stability is achieved without affecting the colour properties of the treated polyolefine. The stabilisers of the invention provide effective light and/or heat stabilisation especially for low- and high-density polethylene and polypropylene and polystyrene as well as polymers of butene-1, pentene-1, 3-methylbutene-1, hexene-1, 4-methylpentene-1, 4-methylhexene-1 and 4,4-dimethylpentene-1, and also co- and terpolymers of olefines, particularly of ethylene or propylene.

Other organic materials susceptible to degradation by the effects of light and the properties of which are improved by the incorporation therein of a compound of formula I include natural and synthetic polymeric materials, for instance natural and synthetic rubbers, the latter including, for example, homo-, co- and terpolymers of acrylonitrile, butadiene and styrene.

Specific synthetic polymers include polyvinyl chloride and vinyl chloride co-polymers, polyvinyl acetate as well as condensation polymers derived from ether, ester (derived from carboxylic, sulphonic or carbonic acids) amide or urethane compounds; polyvinyl acetals; polyacrylates such as polymers and copolymers of methyl acrylate, ethyl acrylate, methyl methacrylate and ethyl methacrylate; polyamides; urea-formaldehyde and melamine-formaldehyde resins; cellulose plastics such as cellulose acetate, cellulose butyrate and cellulose nitrate. Certain of these polymers can, for instance, form the basis of surface coating media such as paints and lacquers having an oil or resin base, such as an alkyd or polyamide resin.

The amount of the compound of formula I which is incorporated into the organic material in order to achieve maximal protection against degradation by light varies according to the properties of the organic material treated and according to the severity of the light radiation and to the length of exposure. However, for most purposes it is sufficient to use an amount of the compound of formula I within the range of from 0.01% to 5% by weight, more preferably within the range of from 0.1% to 2% by weight based on the weight of untreated organic material.

The compounds of formula I may be incorporated into the polymeric material by any of the known techniques for compounding additives with a polymer. For example, the compound of formula I and the polymer may be compounded in an internal mixer. Alternatively, the compound of formula I may be added as a solution or slurry in a suitable solvent or dispersant, for instance an inert organic solvent such as methanol, ethanol or acetone or powdered polymer and the whole mixed intimately in a mixer; and the solvent subsequently removed. As a further alternative the compound of formula I may be added to the polymer during the preparation of the latter, for instance at the latex stage of polymer production, to provide pre-stabilised polymer material.

Optionally, the composition of the invention may contain one or more further additives, especially those used in polymer formulations, such as antioxidants of the phenol or amine type, U.V. absorbers and light protectants, phosphite stabilisers, peroxide decomposers, polyamide stabilisers, basic co-stabilisers, polyvinyl chloride stabilisers, nucleation agents, plasticizers, lubricants, emulsifiers, anti-static agents, flame-protectants, pigments, carbon black, asbestos, glass-fibres, kaolin and talc.

The present invention therefore includes binary, tertiary and multi-component compositions containing, as the stabiliser, a compound of formula I together with one or more functional additives for polymers.

Examples of suitable antioxidants are those of the hindered phenol type such as those selected from the following groups:

(1) Phenolic compounds having the general formula $$Q-(CH_2)_w-A_1$$

wherein
Q is

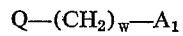

$A_1$ is

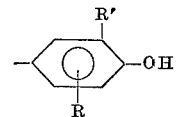

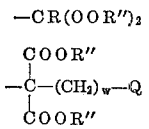

R is hydrogen or lower alkyl
R' is lower alkyl
R'' is alkyl group having from 6–24 carbon atoms
$w$ is an integer from 0 to 4.

Illustrative examples of the compounds shown above are:

di-n-octadecyl-α-(3,5-di-t-butyl-4-hydroxy-benzyl) malonate
di-n-octadecyl-α-(3-t-butyl-4-hydroxy-5-methyl-benzyl) malonate di-n-octadecyl-α,α'bis-(3-t-butyl-4-hydroxy-5-methyl-benzyl)malonate.

(2) Phenolic compounds having the general formula

Illustrative examples of the compounds shown above are:

2,6-di-t-butyl-p-cresol
2-methyl-4,6-di-t-butylphenol and the like
2,6-di-octadecyl-p-cresol (3) Phenolic compounds having the formula

Illustrative examples of the compounds shown are:

2,2'-methylene-bis(6-t-butyl-4-methylphenol)
2,2'-methylene-bis(6-t-butyl-4-ethylphenol)
4,4'-butylidene-bis(2,6-di-t-butylphenol)
4,4'-(2-butylidene)-bis(2-t-butyl-5-methylphenol)

2,2'-methylene-bis-6-(2-t-methylcyclohexyl)-4-methylphenol
2,2'-methylene-bis(3-t-butyl-5-ethylphenol)
4,4'-methylene-bis(3,5-di-t-butylphenol)
4,4'-methylene-bis(3-t-butyl-5-methylphenol)
2,2'-methylene-bis(3-t-butyl-5-methylphenol)
and the like (4) Phenolic compounds having the formula:

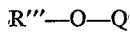
R'''—O—Q

Illustrative examples of such compounds are:

2,5-di-t-butylhydroquinone
2,6-di-t-butylhydroquinone
2,5-di-t-butyl-4-hydroxyanisole (5) Phenolic compounds having the formula:

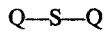
Q—S—Q

Illustrative examples of such compounds are:

4,4'-thiobis-(2-t-butyl-5-methylphenol)
4,4'-thiobis-(2-t-butyl-6-methylphenol)
2,2'-thiobis-(6-t-butyl-4-methylphenol)
4,4'-thiobis-(2-methyl-5-t-butylphenol)

(6) Phenolic compounds having the formula

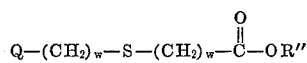
$$Q-(CH_2)_w-S-(CH_2)_w-\overset{O}{\underset{\|}{C}}-OR''$$

Illustrative examples of such compounds are:

octadecyl-(3,5-dimethyl-4-hydroxybenzylthio)-acetate
dodecyl-(3,5-di-t-butyl-4-hydroxybenzylthio)-propionate (7) Phenolic compounds having the formula

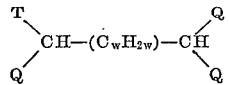

wherein
T is hydrogen
R or Q as defined above.

Illustrative examples of such compounds are:

1,1,3-tris(3,5-dimethyl-4-hydroxyphenyl)-propane
1,1,3-tris(5-t-butyl-4-hydroxy-2-methylphenyl)-butane
1,1,5,5-tetrakis-(3'-t-butyl-4'-hydroxy-6'-methylphenyl)-n-pentane (8) Phenolic compounds having the formula:

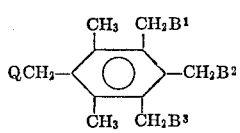

wherein $B^1$, $B^2$ and $B^3$ are hydrogen, methyl or Q, provided that when $B^1$ and $B^3$ are Q then $B^2$ is hydrogen or methyl and when $B^2$ is Q then $B^1$ and $B^3$ are hydrogen or methyl.

Illustrative examples of such compounds are:

1,4-di(3,5-di-t-butyl-4-hydroxybenzyl)-2,3,5,6-tetramethylbenzene
1,3,5-tri(3,5-di-t-butyl-4-hydroxybenzyl)-2,4,6-trimethylbenzene (9) Phenolic compounds having the formula

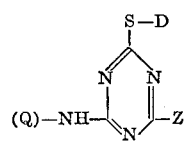

wherein
Z is NHQ, —S—D— or —O—Q
D is alkyl group having from 6–12 carbon atoms or —($C_wH_{2w}$)—S—R''

Illustrative examples of such compounds are:

2,4-bis-(n-octylthio)-6-(3,5-di-t-butyl-4-hydroxyaniline)-1,3,5-triazine
6-(4-hydroxy-3-methyl 5-t-butylanilino)-2,4-bis-(n-octylthio)-1,3,5-triazine
6-(4-hydroxy-3,5-dimethylanilino)-2,4-bis-(n-octylthio)-1,3,5-triazine
6-(4-hydroxy-3,5-di-t-butylanilino)-2,4-bis-(n-octylthio)-1,3,5-triazine
6-(4-hydroxy-3,5-di-t-butylanilino)-4-(4-hydroxy-3,5-di-t-butylphenoxy)-2-(n-octylthio)-1,3,5-triazine
2,4-bis-(4-hydroxy-3,5-di-t-butylanilino)-6-(n-octylthio)-1,3,5-triazine

(10) Phenolic compounds having the formula:

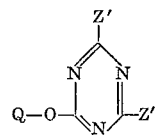

wherein Z' is —O—Q, —S—D or —S—($C_wH_{2w}$)—SD.

Illustrative examples of such compounds are:

2,3-bis-(3,5-di-t-butyl-4-hydroxyphenoxy)-6-(n-octylthio)-1,3,5-triazine
2,4,6-tris-(4-hydroxy-3,5-t-butylphenoxy)-1,3,5-triazine
6-(4-hydroxy-3,5-di-t-butylphenoxy)-2,4-bis-(n-octylthioethylthio)-1,3,5-triazine
6-(4-hydroxy-3-methylphenoxy)-2,4-bis-(n-octylthio)-1,3,5-triazine
6-(4-hydroxy-3-t-butylphenoxy)-2,4-bis-(n-octylthioethylthio)-1,3,5-triazine
6-(4-hydroxy-3-methyl-5-t-butylphenoxy)-2,4-bis-(n-octylthio)-1,3,5-triazine
2,4-bis-(4-hydroxy-3-methyl-5-t-butylphenoxy)-6-(n-octylthio)-1,3,5-triazine
2,4,6-tris-(4-hydroxy-3-methyl-5-t-butylphenoxy)-1,3,5-triazine
6-(4-hydroxy-3,5-di-t-butylphenoxy)-2,4-bis-(n-octylthiopropylthio)-1,3,5-trazine
6-(4-hydroxy-3,5-di-t-butylphenoxy)-2,4-bis-(n-dodecylthioethylthio)-1,3,5-triazine
2,4-bis-(4-hydroxy-3,5-di-t-butylphenoxy)-6-butylthio-1,3,5-triazine
2,4-bis-(4-hydroxy-3,5-di-t-butylhenpoxy)-6-(n-octadecylthio)-1,3,5-triazine
2,4-bis-(4-hydroxy-3,5-di-t-butylphenoxy)-6-(n-dodecylthio)-1,3,5-triazine
2,4-bis-(4-hydroxy-3,5-di-t-butylphenoxy)-6-(n-octylthiopropylthio)-1,3,5-triazine
2,4-bis-(4-hydroxy-3,5-di-t-butylphenoxy)-6-(n-octylthioethylthio)-1,3,5-triazine
2,4-bis-(4-hydroxy-3,5-di-t-butylphenoxy)-6-(n-dodecylthioethylthio)-1,3,5-triazine.

(11) Phenolic compounds having the formula:

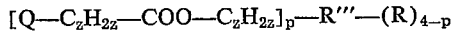
[Q—$C_zH_{2z}$—COO—$C_zH_{2z}$]$_p$—R'''—(R)$_{4-p}$ wherein p is an integer from 2 to 4 and R''' is a tetravalent radical selected from aliphatic hydrocarbons having from 1 to 30 carbon atoms, aliphatic mono- and dithioethers having from 1 to 30 carbon atoms, aliphatic mono- and diethers having from 1 to 30 carbon atoms and z is an integer from 0 to 6.

Illustrative examples of such compounds are:

SUB-CLASS I n-Octadecyl-3-(3,5-di-t-butyl-4-hydroxyphenyl)-propionate
n-Octadecyl-2-(3,5-di-t-butyl-4-hydroxyphenyl)-acetate
n-Octadecyl-3,5-di-t-butyl-4-hydroxybenzoate
n-Hexyl-3,5-di-t-butyl-4-hydroxyphenylbenzoate
n-Dodecyl-3,5-di-t-butyl-4-hydroxyphenylbenzoate
Neo-dodecyl-3-(3,5-di-t-butyl-4-hydroxyphenyl)-propionate Dodecyl-β-(3,5-di-t-butyl-4-hydroxyphenyl)-propionate
Ethyl-α-(4-hydroxy-3,5-di-t-butylphenyl)-isobutyrate
Octadecyl-α-(4-hydroxy-3,5-di-t-butylphenyl)-isobutyrate
Octadecyl-α-(4-hydroxy-3,5-di-t-butylphenyl)-propionate

SUB-CLASS II 2-(n-octylthio)ethyl 3,5-di-t-butyl-4-hydroxybenzoate
2-(n-octylthio)ethyl 3, 5-di-t-butyl-4-hydroxyphenylacetate
2-(n-octadecylthio)ethyl 3,5-di-t-butyl-4-hydroxyphenyl-acetate
2-(n-octadecylthio)ethyl 3,5-di-t-butyl-4-hydroxybenzoate
2-(2-hydroxyethylthio)ethyl 3,5-di-t-butyl-4-hydroxy-benzoate
2,2'-Thiodiethanol bis(3,5-di-t-butyl-4-hydroxyphenyl)acetate
Diethyl glycol bis-[(3,5-di-t-butyl-4-hydroxyphenyl)propionate]
2-(n-octadecylthio)ethyl 3-(3,5-di-t-butyl-4-hydroxyphenyl)propionate
2,2'-Thiodiethanol-bis-3-(3,5-di-t-butyl-4-hydroxyphenyl)propionate
Stearamido N,N-bis-[ethylene 3-(3,5-di-t-butyl-4-hydroxyphenyl)propionate]
n-Butylimino N,N-bis-[ethylene 3-(3,5-di-t-butyl-4-hydroxyphenyl)propionate]
2-(2-stearoyloxyethylthio)ethyl 3,5-di-t-butyl-4-hydroxybenzoate
2-(2-hydroxyethylthio)ethyl 7-(3-methyl-5-t-butyl-4-hydroxyphenyl)heptanoate
2-(2-stearoyloxyethylthio)ethyl 7-(3-methyl-5-t-butyl-4-hydroxyphenyl)heptanoate

SUB-CLASS III 1,2-propylene glycol bis-[3-(3-,5-di-t-butyl-4-hydroxyphenyl)propionate]
Ethylene glycol bis-[3-(3,5-di-t-butyl-4-hydroxyphenyl)propionate]
Neopentylglycol bis-[3-(3-,5-di-t-butyl-4-hydroxyphenyl)propionate]
Ethylene glycol bis-(3,5-di-t-butyl-4-hydroxyphenyl-acetate)
Glycerine-1-n-octadecanoate-2,3-bis-(3,5-di-t-butyl-4-hydroxyphenylacetate
Pentaethylthritol-tetrakis-[3-(3,5-di-t-butyl-4-hydroxyphenyl)propionate]
1,1,1-trimethylol ethane-tris-3-(3,5-di-t-butyl-4-hydroxyphenyl)propionate
Sorbitol hexa-[3-(3,5-di-t-butyl-4-hydroxyphenyl)propionate]
1,2,3-butanetriol tris-[3-(3,5-di-t-butyl-4-hydroxyphenyl)propionate]
2-hydroxyethyl 7-(3-methyl-5-t-butyl-4-hydroxyphenyl)heptanoate
2-stearoyloxyethyl 7-(3-methyl-5-t-butyl-4-hydroxyphenyl)heptanoate
1,6-n-hexanediol-bis[(3',5'-di-t-butyl-4-hydroxyphenyl)propionate]

(12) Phenolic compounds having the formula

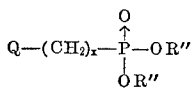

where $x$ is an integer of 1 or 2.
Illustrative examples of such compounds are

Di-n-octadecyl 3,5-di-t-butyl-4-hydroxybenzyl-phosphonate
Di-n-octadecyl 3-t-butyl-4-hydroxy-5-methylbenzyl-phosphonate
Di-n-octadecyl 1-(3,5-di-t-butyl-4-hydroxyphenyl)-ethanephosphonate
Di-n-tetradecyl 3,5-di-t-butyl-4-hydroxybenzyl-phosphonate
Di-n-hexyldecyl 3,5-di-t-butyl-4-hydroxybenzyl-phosphonate
Di-n-docosyl-3,5-di-t-butyl-4-hydroxybenzyl-phosphonate
Di-n-octadecyl 3,5-di-t-butyl-4-hydroxybenzyl-phosphonate.

(13) Phenolic compounds having the formula

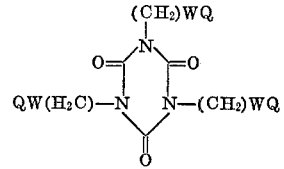

wherein W and Q are defined above.
Illustrative examples of such compounds are:

tris-(3,5-di-t-butyl-4-hydroxybenzyl)isocyanurate
tris-(3-t-butyl-4-hydroxy-5-methylbenzyl)isocyanurate.

While any of the above mentioned antioxidants can be useful in combination with the ultraviolet light stabilizers of this invention, the preferred antioxidants consist of the hindered phenols in groups 1, 8, 9, 10, 11, 12 and 13 as mentioned above. The most preferred hindered phenols are those of groups 1, 9, 11, 12 and 13.

Further examples of antioxidants are those of the aminoaryl series for instance aniline and naphthylamine derivatives as well as their heterocyclic derivatives such as:

phenyl-1-naphthylamine
phenyl-2-naphthylamine
N,N'-diphenyl-p-phenyldiamine
N,N'-di-sec-butyl-p-phenylenediamine
6-Ethoxy-2,2,4-trimethyl-1,2-dihydroquinoline
6-Dodecyl-2,2,4-trimethyl-1,2-dihydroquinoline
Mono- and di-octyliminodibenzyl and
polymerised 2,2,4-trimethyl-1,2-dihydroquinoline.

Ultraviolet absorbers and light protectants include:

(a) 2-(2'-hydroxyphenyl)benzotriazoles, for instance 5'-methyl; 3',5'-di-t-butyl; 5'-t-butyl; 5-chloro-3'; 5'-di-t-butyl; 5-chloro-3'-t-butyl-5'-methyl; 3'-sec.butyl-5'-tert. butyl; 3'-[α-methylbenzyl] - 5' - methyl-; 3'-[α-methylbenzyl)-5'-methyl-5-chloro-; 4'-octoxy-; 3',5'-di-t-amyl; 3'-methyl-5'-carbamethoxyethyl; 5-chloro-3',5'-di-t-amyl derivatives.

(c) 2-hydroxybenzophenones, for instance the 4-hydroxy, 4-methoxy, 4-octoxy-, 4-decyloxy-, 4-dodecyloxy-, 4,2',4'-trihydroxy or 2'-hydroxy-4,4'-dimethoxy derivatives.

(d) 1,3-Bis(2' - hydroxybenzoyl) - benzenes for instance, 1,3-bis-(2'-hydroxy-4'-hexyloxybenzoyl)benzene
1,3-bis(2'-hydroxy-4'-octoxybenzoyl)benzene
1,3-bis-(2'-hydroxy-4'-dodecyloxybenzoyl)benzene (e) Aryl esters from optionally substituted benzoic acids such as phenylsalicylate, octylphenylsalicylate, dibenzoyl resorcinol, bis-(4-tert.butylbenzoyl) resorcinol, benzoylresorcinol and 3,5-di-tert.butyl-4-hydroxy-benzoic acid-2,4-di-tert.butyl phenyl ester and -octadecyl ester and -2-methyl-4,6-di-tert.butyl phenyl ester.

(f) Acrylates, for instance α - Cyano - β,β-diphenyl-acrylic acid ethyl- or iso - octyl ester, α-carbomethoxy-cinnamic acid, methyl- or butyl ester and N-(β-carbomethoxyvinyl)-2-methyl indoline.

(g) Nickel compounds such as nickel complexes of 2,2'-thio - bis - (4 - tert.octylphenol), for instance the 1:1 and 1:2 complexes, optionally having other ligands such as n - butylamine, triethanolamine or N - cyclohexyl-diethanolamine; nickel complexes of bis - (4 - tert.octyl-phenyl) sulphone such as the 2:1 complex, optionally having other ligands such as 2-ethylcaproic acid; nickel dibutyl di-thiocarbamates; nickel salts of 4-hydroxy-3,5-di - tert.butylbenzyl - phosphonic acid mono-alkyl esters such as the methyl-, ethyl- or butyl esters; the nickel complex of 2 - hydroxy - 4 - methyl-phenyl-undecylketonoxime; and nickel - 3,5-di-tert.butyl - 4 - hydroxy benzoate, and (h) Oxalic acid diamides, for instance 4,4'-dioctyloxyoxanilide
2,2'-dioctyloxy-5,5'-di-tert.butyl-oxanilide
2,2'-didodecyloxy-5,5'-di-tert.butyl oxanilide
2-ethoxy-5-tertiarybutyl-2'-ethyl-oxanilide
2-ethoxy-2'-ethyl-oxanilide mixtures of o- and p-methoxy and ethoxy-di-substituted oxanilides and the compound of formula:

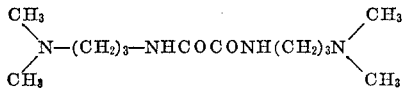

Phosphite stabilisers include triphenyl phosphite, diphenylalkyl phosphites, phenyl dialkyl phosphites, trinonylphenyl phosphite, trilauryl phosphite, trioctadecyl phosphite, 3,9 - di - isodecyloxy - 2,4,8,10-tetraoxa-3,9-diphosphaspiro-(5,5)-undecane and tri - (4-hydroxy-3,5-di-tert.-butylphenyl)phosphite.

Peroxide-decomposing compounds for polyolefins include esters of β-thiodipropionic acids, for instance the lauryl-, stearyl-, myristyl- or tridecyl esters, salts of mercaptobenzimidazoles such as the zinc salt and diphenylthiourea.

Suitable polyamide stabilisers include copper salts in combination with iodides and/or further phosphorus compounds and salts of bivalent manganese.

Basic co-stabilisers are, for example, polyvinylpyrrolidone, melamine, benzoguanamine, triallyl cyanurate, dicyandiamide, urea derivatives, hydrazine derivatives, amines, polyamides, polyurethanes, alkali and alkaline earth salts of higher saturated or unsaturated fatty acids such as calcium stearate.

Polyvinyl chloride stabilisers include organotin compounds, organo lead compounds and Ba/Cd salts of fatty acids.

Examples of nucleation agents are 4-tert.butyl benzoic acid, adipic acid and diphenylacetic acid.

As with the compound of formula I, any further additive is advantageously employed in a proportion within the range of from 0.01% to 5% by weight, based on the weight of untreated organic materials.

In combination with an antioxidant suitable for use in inhibiting oxidative deterioration of polyolefines, or in tertiary combinations with such antioxidants and U.V. absorbers listed above, the compounds of formula I provide extremely effective all round stabilising packages for polyolefines.

Some Examples will now be given. Parts and percentages shown therein are by weight unless otherwise stated.

Example 1

One hundred parts by weight of ethyl(2,2,6,6-tetramethylpiperidinylidene-4)acetate in 500 parts by volume of ethyl alcohol was hydrogenated at 100° C. and 100 atm. of hydrogen using a 5% palladium on carbon catalyst to give, on removal of the catalyst by filtration and the ethyl alcohol by distillation (12 mm. Hg/100° C. maximum) ethyl (2,2,6,6 - tetramethylpiperidinyl - 4) acetate, (90 parts by weight, 90% of theory yield) boiling at 138–40° C./12 mm. Hg, and having the following elemental analysis by weight:

|  | Percent | | |
|---|---|---|---|
|  | C | H | N |
| Found | 68.94 | 10.98 | 6.44 |
| Required for $C_{13}H_{25}NO_2$ | 68.68 | 11.08 | 6.16 |

Example 2

13.5 Parts by weight of ethyl(2,2,6,6 - tetramethyl-piperidilny-4)acetate, 10.5 parts by weight of 2,2,6,6-tetramethylpiperidin-4-ol, and 1.2 parts by weight of lithium amide were heated together with stirring at 160° for 1 hour during which time the ethyl alcohol produced during the reaction was allowed to distil from the reaction flask. The resulting mass was cooled and extracted with 200 parts by volume of water, and insoluble material was collected by filtration and dried at 60° C./0.1 mm. Hg to give (2,2,6,6 - tetramethylpiperidinyl - 4 - ) (2',2',6',6'-tetramethylpiperidinyl-4') acetate, melting at 25° C. and having the following elemental analysis by weight.

|  | Percent | | |
|---|---|---|---|
|  | C | H | N |
| Found | 70.99 | 11.15 | 8.29 |
| Calculated for $C_{20}H_{38}N_2O_2$ | 70.96 | 11.31 | 8.27 |

Example 3

13.5 Parts by weight of ethyl(2,2,6,6-tetramethylpiperidinyl-4)acetate, 10 parts by weight of cyclohexanol and 1.2 parts by weight of lithium amide were heated at 160° C. for 15 minutes, the pressure in the flask was then lowered to 12 mm. and the heating continued for 15 minutes. The resulting mass was cooled and poured into water (200 parts by volume) which was extracted with 4× 50 parts by volume of ether. The combined ether extracts were dried over magnesium sulphate, and the ether removed by distillation. The residue oil was distilled and the fraction b.p. 121–2° C./0.6 mm. Hg collected to give cyclohexyl (2,2,6,6-tetramethylpiperidinyl-4) acetate having the following analysis by weight:

|  | Percent | | |
|---|---|---|---|
|  | C | H | N |
| Found | 72.73 | 10.81 | 5.00 |
| Required for $C_{17}H_{31}NO_2$ | 72.55 | 11.10 | 4.98 |

Example 4

11.4 Parts by weight of ethyl (2,2,6,6-tetramethylpiperidinyl-4)acetate, 13.5 parts by weight of n-octadecanol and 1 part by weight of lithium amide were heated at 160° C./760 mm. Hg for 30 minutes and 160° C./12 mm. Hg for 5 minutes. The resulting mass was worked up as in Example 3 to give n-octadecyl (2,2,6,6-tetramethylpiperidinyl-4) acetate boiling at 232–4° C./0.7 mm. Hg and having the following elemental analysis by weight:

|  | Percent | | |
|---|---|---|---|
|  | C | H | N |
| Found | 77.24 | 12.65 | 2.97 |
| Calculated for $C_{29}H_{57}NO_2$ | 77.10 | 12.72 | 3.10 |

Example 5

11.4 Parts by weight of ethyl(2,2,6,6-tetramethylpiperidinyl-4)acetate, 7.8 parts by weight of n-octanol and 1 part by weight of lithium amide were reacted as in Example 4. The product was cooled, dissolved in 100 parts by volume of ether and the lithium amide removed by filtration. The ether was removed by distillation and the residual oil purified by distillation to give n-octyl-(2,2,6,6-tetramethylpiperidinyl-4) acetate, boiling at 148° C./1.0 mm. Hg and having the following elemental analysis by weight.

|  | Percent | | |
|---|---|---|---|
|  | C | H | N |
| Found | 73.35 | 12.07 | 4.35 |
| Calculated for $C_{19}H_{37}NO_2$ | 73.26 | 11.97 | 4.50 |

Example 6

11.4 Parts by weight of ethyl (2,2,6,6-tetramethylpiperidinyl-4) acetate, 6.5 parts by weight of benzyl alcohol and 1 part by weight of lithium amide were reacted and worked up as in Example 4 to give benzyl (2,2,6,6-tetramethylpiperidinyl-4) acetate, boiling at 133° C./0.6 mm. Hg and having the following elemental analysis by weight:

|  | Percent | | |
| --- | --- | --- | --- |
|  | C | H | N |
| Found | 74.96 | 9.37 | 5.03 |
| Calculated for $C_{18}H_{27}NO_2$ | 74.70 | 9.40 | 4.84 |

Example 7

6.9 Parts by weight of ethyl (2,2,6,6-tetramethylpiperdinyl-4) acetate, 5.6 parts by weight of n-dodecylamine, and 0.5 parts by weight of sodium methoxide were heated with stirring at 140° C./760 mm. Hg for 30 minutes and then at 140° C./12 mm. Hg for 5 minutes. The product was cooled and dissolved in 100 parts by volume of ether. This was washed with 50 parts by volume of water, then dried over magnesium sulphate and finally stripped off at 100° C./12 mm. Hg. The remaining oil was purified by distillation to give N-n-dodecyl(2,2,6,6-tetramethylpiperidinyl-4) acetamide, boiling at 204° C./0.6 mm. Hg and having the following elemental analysis by weight:

|  | Percent | | |
| --- | --- | --- | --- |
|  | C | H | N |
| Found | 75.23 | 12.45 | 7.03 |
| Calculated for $C_{23}H_{46}N_2O$ | 75.35 | 12.65 | 7.64 |

Example 8

11.4 Parts by weight of ethyl(2,2,6,6-tetramethylpiperidinyl-4)acetate, 5 parts by weight of cyclohexylamine, and 0.5 parts by weight of sodium methoxide were heated with stirring at 160° C./760 mm. Hg for 1 hour and at 160° C./12 mm. Hg for 5 minutes. The resulting mass was cooled and triturated with 200 parts by volume of water, to give a white solid, which was collected by filtration, dried at 60° C. in air, and recrystallised from 50 parts by volume of petroleum ether (boiling range 60–80° C.) to give, after drying at 60° C./12 mm. Hg, pure N-cyclohexyl (2,2,6,6-tetramethylpiperidinyl-4) acetamide, melting at 131° C. and having the following elemental analysis by weight:

|  | Percent | | |
| --- | --- | --- | --- |
|  | C | H | N |
| Found | 72.79 | 11.49 | 9.97 |
| Calculated for $C_{17}H_{32}N_2O$ | 72.81 | 11.50 | 9.99 |

Example 9

11.4 Parts by weight of ethyl(2,2,6,6-tetramethylpiperidinyl-4)acetate, 10.8 parts by weight of n-octadecylamine and 0.5 parts by weight of sodium methoxide were heated at 180–190° C./760 mm. Hg for 1 hour, the resulting mass was cooled and triturated with water (100 parts by volume) to give a white solid, this was collected by filtration and dried at 40° C./12 mm. Hg. Recrystallization from 50 parts by volume of petroleum ether (boiling range 60–80° C.) gave pure N-n-octadecyl (2,2,6,6-tetramethylpiperidinyl-4) acetamide, melting at 59° C. and having the following elemental analysis by weight:

|  | Percent | | |
| --- | --- | --- | --- |
|  | C | H | N |
| Found | 77.44 | 13.04 | 5.91 |
| Required for $C_{29}H_{58}N_2O$ | 77.27 | 12.97 | 6.21 |

Examples 10 to 20

38 Parts of polypropylene were homogenised with 0.076 parts of n-octadecyl-β-(4'-hydroxy-3',5'-t-butylphenyl) propionate in a kneading machine over a period of 3 minutes. 0.19 parts of the product of Example 1 was then added and homogenisation continued for another 7 minutes.

The homogenised mixture was removed from the kneader and pressed to a thickness of from 2 to 3 mm. in a press.

9 parts of the polypropylene mixtures were then charged into a second press in which the press-plates were protected by aluminium foil having a thickness of 0.1 mm. The press was closed and, for 2 minutes, no pressure was applied. The pressure was then increased up to a maximum of 12 tons and this pressure held for 6 minutes, the temperature of the press being 260° C. The pressure was released and the material (0.3 mm. thick) was cooled under running water.

This material was cut into from 3 to 5 pieces of 35 x 35 mm. section and re-charged to the press. The press was closed and no pressure was applied for 2 minutes. Over another 2 minutes the pressure was increased to 8 tons, the press temperature being 260° C. This pressure was maintained for 2 minutes and then the pressure released. The polypropylene foil of 0.1 mm. thickness was removed and tempered immediately in a circulating air oven maintained at 150° C. over a period of 60 minutes.

A section measuring 44 x 100 mm. was separated from the 0.1 mm. tempered polypropylene foil and exposed to light irradiation in a fademeter device consisting of a circular bank of 28 alternating sunlight and blacklight lamps. The sunlight lamps were 2 feet long, 20-watt fluorescent lamps characterised by a peak emission of 3100 Angstrom units; the blacklight lamps were 2 feet long, 20 watt ultraviolet lamps characterised by a peak emission of 3500 Angstrom units. The sample was rotated concentrically about the bank of lamps so that the radiation therefrom was uniformly distributed over the section under test.

The exposed sample was examined periodically, when portions of it were removed for tensile testing and the time (T) required for the elongation of the sample to decrease to 50% of the initial elongation was determined.

The time ($T_c$) required for the elongation of a control gave (not containing the product of Example 1) to decrease to 50% of the initial elongation was then determined.

The performance of the compound of Example 1 as a light stabiliser could then be assessed by determining the factor $T/T_c$.

The results obtained, including the use of other compounds of the invention as stabiliser, are set out in the following Table I:

TABLE I

| Ex. | Additive | Factor—T (for compound), $T_c$ (for control) |
| --- | --- | --- |
| 10 | Ethyl (2,2,6,6-tetramethyl piperidinyl-4) acetate | 3.3 |
| 11 | n-Octyl (2,2,6,6-tetramethyl piperidinyl-4) acetate. | 3.3 |
| 12 | N-benzyl [(2,2,6,6-tetramethyl piperidinyl-4) acetamide]. | >4 |
| 13 | Cyclohexyl (2,2,6,6-tetramethyl piperidinyl-4) acetate. | 2.6 |
| 14 | Benzyl (2,2,6,6-tetramethyl piperidinyl-4) acetate. | 3.8 |
| 15 | (2,2,6,6-tetramethyl piperidinyl-4) (2',2',6',6'-tetramethyl piperidinyl-4') acetate. | 9.4 |
| 16 | N-n-dodecyl (2,2,6,6-tetramethyl piperidinyl-4) acetamide. | 7.3 |
| 17 | N-n-octadecyl (2,2,6,6-tetramethyl piperidinyl-4) acetamide. | 3.9 |
| 18 | N-cyclohexyl (2,2,6,6-tetramethyl piperidinyl-4) acetamide. | 5.6 |
| 19 | N-n-octadecyl (2,2,6,6-tetramethyl piperidinyl-4) acetate. | 1.9 |
| 20 | N-(n-hexyl) (2,2,6,6-tetramethyl piperidinyl-4) acetamide. | 3.5 |

Example 21

11.4 parts by weight of ethyl (2,2,6,6-tetramethylpiperidinyl-4) acetate, 5.4 parts by weight of benzylamine, and 2.5 parts by weight of sodium methoxide were heated with stirring at 180° C. for 30 minutes. The product was dissolved in 300 parts by volume of ether and the ether extract was washed with water (3× 50 parts by volume), dried over magnesium sulphate, and evaporated off under reduced pressure. The solid residue was recrystallised from cyclohexane (100 parts by volume) to give N-benzyl [(2,2,6,6-tetramethylpiperidinyl-4) acetamide], melting at 104° C. and having the following elemental analysis by weight:

Found: C, 75.40; H, 9.74; N, 9.51%. Required for $C_{18}H_{28}N_2O$: C, 74.96; H, 9.78; N, 9.71%.

Example 22

11.4 parts by weight of ethyl (2,2,6,6-tetramethylpiperidinyl-4) acetate, 10.1 parts by weight of n-hexylamine and 2.7 parts by weight of sodium methoxide were heated at 100° C. with stirring for 30 minutes, at 160° C. for 20 minutes and finally at 160° C. at 12 mm. Hg for 10 minutes; during the final period, the ethyl alcohol produced was allowed to distil from the reaction flask.

The product was isolated by ether extraction and purified by distillation to give N-(n-hexyl) (2,2,6,6-tetramethylpiperidinyl-4) acetamide, boiling at 180–181° C./1 mm. and having the following elemental analysis by weight:

|  | Percent | | |
|---|---|---|---|
|  | C | H | N |
| Found | 72.09 | 11.63 | 9.51 |
| Required for $C_{17}H_{34}N_2O$ | 72.29 | 12.13 | 9.92 |

Example 23

A solution of 22.7 parts by weight of ethyl (2,2,6,6-tetramethylpiperidinyl-4)acetate in 250 parts by weight of 18% hydrochloric acid was heated under reflux conditions for 4 hours.

The volume of solution was then reduced to approximately 50 parts by distillation under reduced pressure and the white solid which formed was collected by filtration. This solid was washed with acetone and dried to give 20 parts by weight (85% of theory yield) of (2,2,6,6-tetramethylpiperidinyl-4)acetic acid hydrochloride, decomposing above 250° C. and having the following elemental analysis by weight:

|  | Percent | | | |
|---|---|---|---|---|
|  | C | H | N | Cl |
| Found | 55.92 | 9.41 | 5.82 | 15.10 |
| Required for $C_{11}H_{22}ClNO_2$ | 56.10 | 9.35 | 5.95 | 15.10 |

Example 24

A solution of 15 parts by weight of ethyl(2,2,6,6-tetramethylpiperidinyl-4)acetate in 200 ml. of methanol saturated with ammonia was allowed to stand at room temperature for 30 days. The methanol was then removed by distillation under reduced pressure, and the white residual solid was purified by reprecipitation from an ethyl acetate solution by the addition of petroleum ether (boiling range 40–60° C.). In this way, there were obtained 4.7 parts by weight of (2,2,6,6-tetramethylpiperidinyl-4) acetamide, containing 0.5 molecules of methanol of crystallisation and melting at 54° C., and having the following elemental analysis by weight:

|  | Percent | | |
|---|---|---|---|
|  | C | H | N |
| Found | 64.51 | 11.02 | 13.14 |
| Required for $C_{23}H_{48}N_4O_3$ | 64.45 | 11.29 | 13.07 |

Example 25

A solution of 2.5 parts by weight of (2,2,6,6 - tetramethylpiperidinyl-4)acetic acid hydrochloride (Example 23) in 20 parts by volume of thionyl chloride, was heated under reflux conditions for 4 hours. The excess thionyl chloride was then removed by distillation under reduced pressure, and the residual solid washed with petroleum ether (boiling range 40–60° C.) to give (2,2,6,6-tetramethylpiperidinyl-4)acetyl chloride hydrochloride. This was taken up in 25 parts by volume of aniline without further purification and heated at 100° C. for 2 hours.

The resulting suspension was cooled and poured into 100 parts by volume of water and the water was extracted with 4× 30 parts by volume of diethyl ether. The ether extracts were combined, dried and the ether removed by distillation. The residual oil was triturated with petroleum ether (boiling range 40–60° C.) and a white solid collected by filtration. This was recrystallised from 75 parts by volume of cyclohexane to give 0.7 part by weight of N - phenyl(2,2,6,6 - tetramethylpiperidinyl - 4)acetamide, melting at 154–6° C. and having the following elemental analysis by weight:

|  | Percent | | |
|---|---|---|---|
|  | C | H | N |
| Found | 74.21 | 9.62 | 9.81 |
| Required for $C_{17}H_{26}N_2O$ | 74.41 | 9.55 | 10.21 |

Example 26

(2,2,6,6 - Tetramethylpiperidinyl - 4)acetylchloride hydrochloride was produced as in Example 25 and heated at 100° for 3 hours in 25 parts by volume of di-n-butylamine. The reaction was worked up as in Example 25 to give N,N-di(n-butyl)(2,2,6,6 - tetramethylpiperidinyl - 4)acetamide, boiling at 150–5°/0.6 mm., and having the following elemental analysis by weight:

|  | Percent | | |
|---|---|---|---|
|  | C | H | N |
| Found | 73.43 | 12.24 | 9.03 |
| Required for $C_{19}H_{38}N_{20}$ | 73.49 | 12.23 | 9.02 |

Example 27

A mixture of 11.4 parts by weight of ethyl (2,2,6,6-tetramethylpiperidinyl-4) acetate, 13.4 parts by weight of oleyl alcohol and 0.5 parts by weight of lithium amide were reacted as in Example 3 to given 6.0 parts by weight of n-octadec - 9 - enyl (2',2',6',6' - tetramethylpiperidinyl-4) acetate boiling at 216–222° C./0.3 mm. and having the following elemental analysis by weight:

|  | Percent | | |
|---|---|---|---|
|  | C | H | N |
| Found | 77.22 | 12.44 | 3.14 |
| Required for $C_{29}H_{55}NO_2$ | 77.45 | 12.33 | 3.11 |

I claim:
1. A composition comprising a polymer and an ultraviolet light stabilizing amount of a compound of the formula

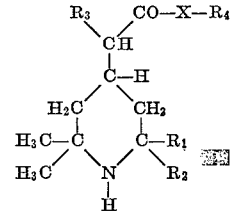

wherein
$R_1$ and $R_2$ are the same or different and each is a straight- or branched alkyl residue having from 1 to 12 carbon atoms or $R_1$ and $R_2$, together with the carbon atom to which they are bound form a cycloalkyl residue having from 5 to 12 carbon atoms, $R_3$ is hydrogen, a straight- or branched alkyl residue having from 1 to 4 carbon atoms, an aralkyl residue having from 7 to 9 carbon atoms, or a cycloalkyl residue having 5 to 6 carbon atoms $R_4$ is hydrogen, a hydrocarbyl residue having from 1 to 20 carbon atoms, either unsubstituted or substituted by halogen, or interrupted by one or more oxygen or sulphur atoms, or $R_4$ has the structure:

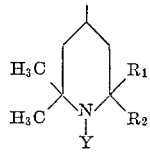

wherein Y is hydrogen or a straight- or branched alkyl residue having from 1 to 12 carbon atoms, an alkenyl residue having from 3 to 12 carbon atoms or an aralkyl residue having from 7 to 12 carbon atoms and $R_1$ and $R_2$ have their previous significance;

X is —O—, —S— or >$NR_5$ wherein $R_5$ has the same significance as $R_3$; or $R_4$ and $R_5$, together with the nitrogen atom to which they are bound form a heterocyclic residue having from 4 to 10 carbon atoms.

2. A composition as claimed in claim 1 comprising a compound of the formula of claim 1 wherein $R_1$ and $R_2$ are each methyl.

3. A composition as claimed in claim 1 comprising a compound of the formula of claim 1 wherein $R_3$ and $R_5$ are each hydrogen or an alkyl residue having from 1 to 4 carbon atoms.

4. A composition as claimed in claim 1 comprising a compound of formula of claim 1 wherein the substituent $R_4$ has at least 5 carbon atoms.

5. A composition as claimed in claim 1 wherein the compound of formula is ethyl-(2,2,6,6-tetramethyl-piperidinyl-4)-acetate.

6. A composition as claimed in claim 1 wherein the compound of formula is n-octyl-(2,2,6,6 - tetramethylpiperidinyl-4)-acetate.

7. A composition as claimed in claim 1 wherein the compound of formula is benzyl-(2,2,6,6-tetramethyl-piperidinyl-4)-acetate.

8. A composition as claimed in claim 1 wherein the compound of formula is (2,2,6,6-tetramethyl-piperidinyl-4)-(2',2',6',6'-tetramethyl-piperidinyl-4'-)acetate.

9. A composition as claimed in claim 1 wherein the compound of formula is N-n-dodecyl-(2,2,6,6-tetramethyl-piperidinyl-4)-acetamide.

10. A composition as claimed in claim 1 wherein the compound of formula is N-cyclohexyl-(2,2,6,6 - tetramethylpiperidinyl-4)-acetamide.

11. A composition as claimed in claim 1 wherein the polymeric material is a polyolefine.

12. A composition as claimed in claim 11 wherein the polyolefine is low- or high-density polyethylene or polypropylene, or polystyrene.

13. A composition as claimed in claim 1 wherein the amount of the compound of formula is within the range of from 0.01% to 5% by weight based on the weight of untreated polymeric material.

References Cited
UNITED STATES PATENTS

| | | | |
|---|---|---|---|
| 3,534,048 | 10/1970 | Murayama et al. | 260—293 |
| 3,536,720 | 10/1970 | Murayama et al. | 260—293 |
| 3,684,765 | 8/1972 | Matsui et al. | 260—45.8 |
| 3,663,558 | 5/1972 | Murayama et al. | 260—45.8 |
| 3,705,126 | 12/1972 | Matsui et al. | 260—45.8 |
| 3,705,166 | 12/1972 | Murayama et al. | 260—45.8 |

FOREIGN PATENTS 1,214,426  12/1970  Great Britain.

V. P. HOKE, Primary Examiner

U.S. Cl. X.R.

106—176; 260—45.8 NZ, 293.63, 293.64, 293.77, 293.76, 293.81, 293.85, 293.86, 293.88, 293.73